United States Patent [19]
Harris

[11] 4,081,045
[45] Mar. 28, 1978

[54] RAIL SCALE
[75] Inventor: Raymond Harris, Huntington Beach, Calif.
[73] Assignee: United S. C. F., Inc., South Gate, Calif.
[21] Appl. No.: 758,138
[22] Filed: Jan. 10, 1977
[51] Int. Cl.² ............................................. G01G 19/06
[52] U.S. Cl. .................................................. 177/163
[58] Field of Search ................................ 177/163, 263

[56] References Cited
U.S. PATENT DOCUMENTS

| | | | |
|---|---|---|---|
| 998,540 | 7/1911 | Manes | 177/163 |
| 3,842,923 | 10/1974 | Moore | 177/163 |
| 3,894,592 | 7/1975 | Andersson | 177/163 |

Primary Examiner—Joseph W. Hartary
Attorney, Agent, or Firm—Fulwider, Patton, Rieber, Lee & Utecht

[57] ABSTRACT

The invention covers an improved rail scale having a live rail and at least two weight measuring means adapted to be mounted and secured onto the fixed rail-support system. The improvement comprises the use of a single unitary U-shaped rail hanger having a length that is substantially co-extensive with the length of the live rail. Another improvement comprises the use of load cells as the weight measuring means wherein the load cells are mounted with their cylindrical axis at right angles to the lateral axis of the live rail.

4 Claims, 4 Drawing Figures

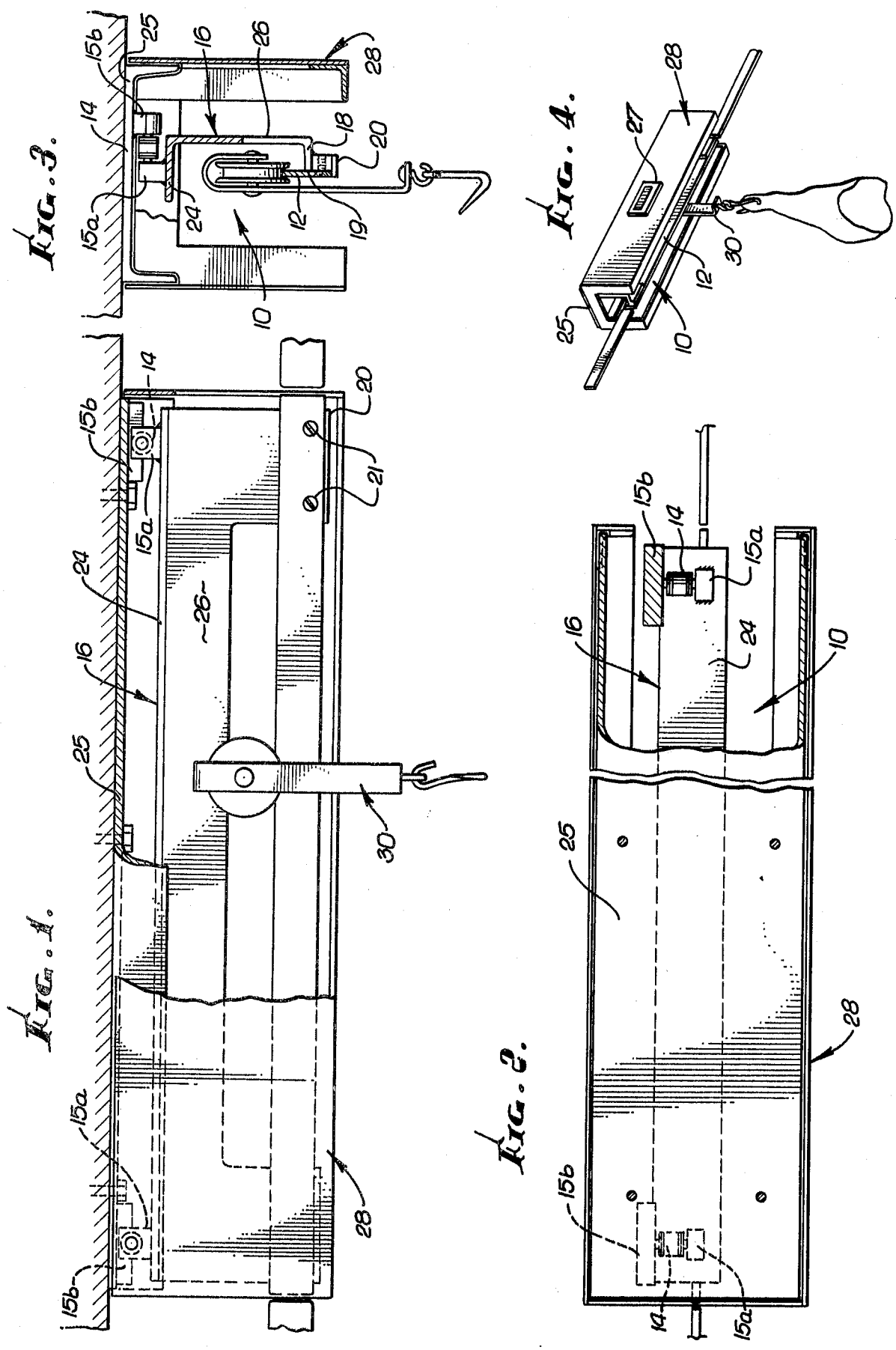

RAIL SCALE

BACKGROUND OF THE INVENTION

1. Field of the Invention

The invention relates to an improvement in overhead rail scales which are used to weigh objects such as sides of meat, conveyed on a rail system.

2. Description of the Prior Art

Overhead rail scales form an integral part of overhead rail systems which are used to convey and weigh objects as they are transported across the rail system. Such scales are commonly used to weigh large sides of meat as they are moved by an overhead rail system from a loading dock to the butcher's block.

Rail scales are generally comprised of a "live rail", i.e., a vertically moveable rail that is in line, when at rest, with the fixed rail supported by the overhead rail system, and a pair of rail hangers fastened at each end portion of the live rail and connected to weight measuring means which are fixed to the overhead rail system.

In operation, the object to be weighed is moved along the rail system by means of a load carrying wheel assembly which rolls along the fixed rail and onto the live rail. When the object to be weighed is on the live rail, its movement is stopped and the weight of the object causes the live rail to deflect downwardly, causing a readout in the measuring gauge associated with the weight measuring means.

When the weight measuring means are load cells, it has been the common practice to align the load cells so that their cylindrical axes are parallel to the lateral axis of the live rail.

Conventional rail scales have, in general, performed satisfactorily but have experienced some problems in connection with installation and operation. Rail scales are difficult to calibrate and align with the fixed rail and as a result, about 7 to 8 hours are required to achieve a satisfactory alignment and calibration. In addition, the rail hangers at each end of the live rail become permanently deflected over the passage of time. This deflection introduces error into weighing measurements made by the scales and results in a slight misalignment in the live rail vis-a-vis the fixed rail.

Conventional rail scales also require the presence of a metal bar, referred to as a "check", to prevent any swaying of the live rail and rail hangers. The checks are generally connected to the bottom end portion of each rail hanger and to the rail support system.

SUMMARY OF THE INVENTION

It has been discovered that the disadvantages associated with prior rail scales, as aforesaid, may be eliminated by replacing the pair of rail hangers with a single unitary U-shaped hanger having a length that is substantially coextensive with the length of the live rail.

It has further been discovered that if the cylindrical axis of the load cells commonly used with rail scale is changed so as to be at right angles to the lateral axis of the live rail, the sway in such rail scales and the resultant need for checks may both be eliminated.

BRIEF DESCRIPTION OF THE DRAWINGS

The invention will be more specifically described in connection with the accompanying drawings in which:

FIG. 1 is a side view of the rail scale;
FIG. 2 is a top view of the rail scale;
FIG. 3 is an end view of the rail scale;
FIG. 4 is a perspective view of the rail scale in association with a fixed rail.

DESCRIPTION OF THE PREFERRED EMBODIMENT

Referring now to the drawings, the improved rail scale of the instant invention is generally referred to by the numeral 10 and comprises a live rail 12 connected to a single unitary U-shaped rail hanger 16 which is connected to load cells 14 by brackets 15a. The load cells 14 are fixedly connected to the rail support system 17 by brackets 15b.

The U-shaped hanger 16 is comprised by a first leg 18, a second leg 24, and a vertical member 26. The first leg 18 has a bracket 20 depending therefrom. The live rail 12 is positioned against the toe 19 of the first leg 18 and is bolted against bracket 20 by bolts 21. The second leg 24 of the U-shaped rail hanger 16 is fixed to a pair of brackets 15a which are connected to a pair of load cells 14. The load cells 14 are in turn connected to a pair of brackets 15b fixed to an iron 25 adapted to be secured to the rail support system. A load carrying wheel assembly 30 is illustrated in FIG. 1.

In operation the load carrying wheel assembly 30 with an object to be weighed is moved along the fixed rail and onto the live rail. The weight of the object causes the live rail to deflect downwardly which accuates the load cells 14 to produce a readout for the weight of the object on gauge 27.

A significant advantage realized by the improved rail scale of the instant invention is that by means of the length of the single unitary U-shaped rail hanger 16, much less permanent bending or deflection is experienced in this rail hanger 16 as compared to the pair of rail hangers used in previous rail scales. This decreases the amount of error which may be introduced into the scale and minimizes any misalignment between the fixed rail and live rail resulting from such permanent deflections.

Another significant advantage is that by use of the single unitary U-shaped rail hanger, the rail scale may be aligned and calibrated in about 5 minutes as compared to the 7 to 8 hour period required for such alignment and calibration when using a pair of rail hangers. Because the rail hanger 16 is one unitary piece, the need for alignment of the pair of rail hangers is eliminated.

An additional advantage is realized if the cylindrical axis of the load cell is changed from its previous direction of being parallel to the lateral axis of the live rail, to a direction that is at right angles to the lateral axis of the live rail. By reason of this right angle disposition, no sway can develop in the rail hanger because load cells 14 will only permit a rotational movement in a plane parallel to the live rail. With the elimination of the sway problem, the checks which were needed to prevent sway may also be eliminated.

In the preferred embodiment, the rail scale is enclosed in a rectangular box 28 which is shown in cutaway section on FIG. 1. The use of the rectangular box is desireable because it provides a visual indication of when the live rail is loaded with a weight. The box 28 will move downwardly with the deflection of the live rail, and may be more easily observed, because of its relative size, than the live rail.

While the embodiment of the invention chosen herein for purposes of disclosure is considered to be preferred, it is to be understood that the invention is intended to cover all changes and modifications of the disclosed embodiment which fall within the spirit and scope of the invention.

I claim:

1. An improved rail scale having a live rail and at least two weight measuring means adapted to be fixedly connected to a rail support system, said improvement comprising a single unitary U-shaped rail hanger having a length that is substantially co-extensive with the length of the live rail, said U-shaped rail hanger having a first leg adapted for connection to the live rail, a second leg adapted for connection to the weight measuring means, and a vertical member connecting said legs and parallel to the live rail.

2. An improved rail scale as set forth in claim 1 wherein said legs are substantially parallel to each other and are disposed to said vertical member at approximate right angles thereto.

3. An improved rail scale as set forth in claim 1 wherein said weight measuring means comprise load cells having their cylindrical axes at right angles to the lateral axis of the live rail.

4. An improved rail scale as set forth in claim 1 wherein said scale is enclosed in a rectangular box which provides a visual indication of when the live rail is loaded with a weight by the relative downward movement of said box.

* * * * *